No. 878,531. PATENTED FEB. 11, 1908.
A. J. JACKSON.
WEFT REPLENISHING LOOM.
APPLICATION FILED JULY 30, 1906.

6 SHEETS—SHEET 1.

WITNESSES.

INVENTOR.
Arthur James Jackson
By his Attorneys

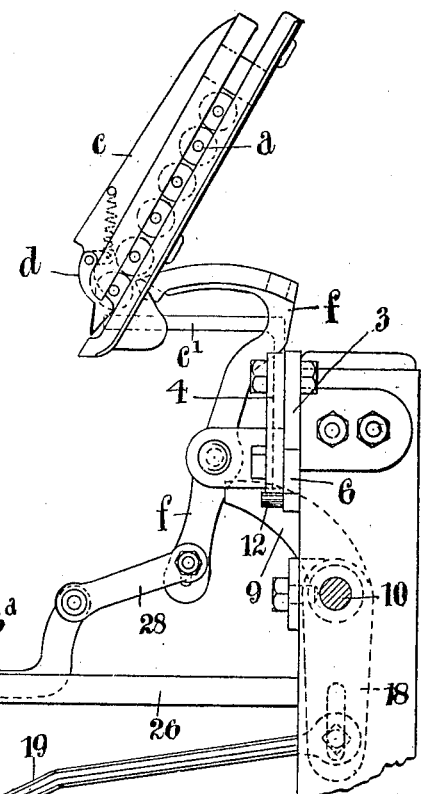
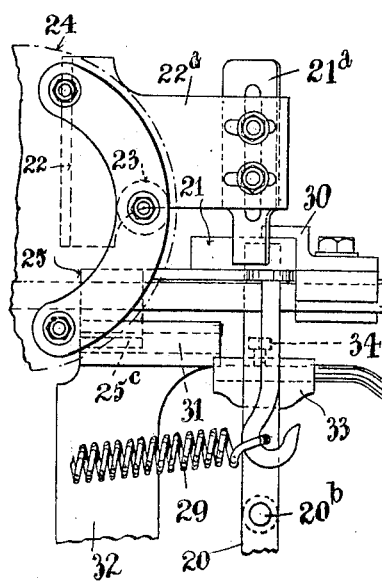
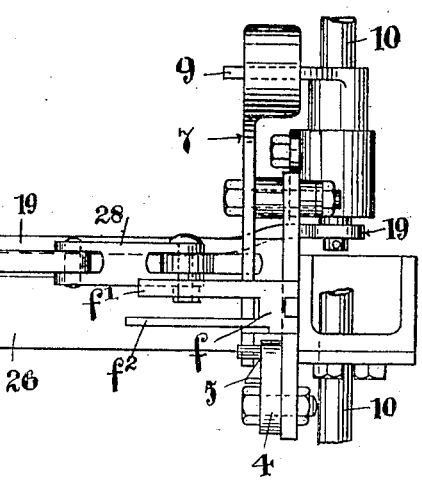
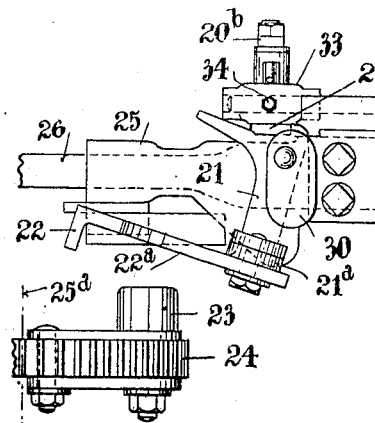

No. 878,531. PATENTED FEB. 11, 1908.
A. J. JACKSON.
WEFT REPLENISHING LOOM.
APPLICATION FILED JULY 30, 1906.

6 SHEETS—SHEET 3.

Fig. 5ᵃ.

WITNESSES.
INVENTOR.
Arthur James Jackson
By his Attorneys

No. 878,531. PATENTED FEB. 11, 1908.
A. J. JACKSON.
WEFT REPLENISHING LOOM.
APPLICATION FILED JULY 30, 1906.

6 SHEETS—SHEET 4.

WITNESSES.
H. W. Sierichs
A. J. Heuman

INVENTOR
Arthur James Jackson
By his Attorney Richardson

No. 878,531. PATENTED FEB. 11, 1908.
A. J. JACKSON.
WEFT REPLENISHING LOOM.
APPLICATION FILED JULY 30, 1906.

6 SHEETS—SHEET 5.

WITNESSES.
INVENTOR
Arthur James Jackson
By his Attorneys

No. 878,531. PATENTED FEB. 11, 1908.
A. J. JACKSON.
WEFT REPLENISHING LOOM.
APPLICATION FILED JULY 30, 1906.
6 SHEETS—SHEET 6.
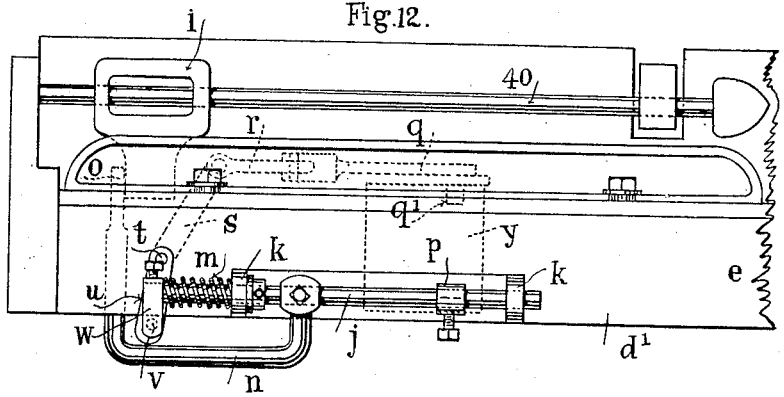
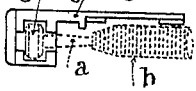
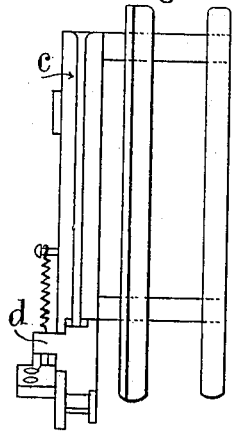
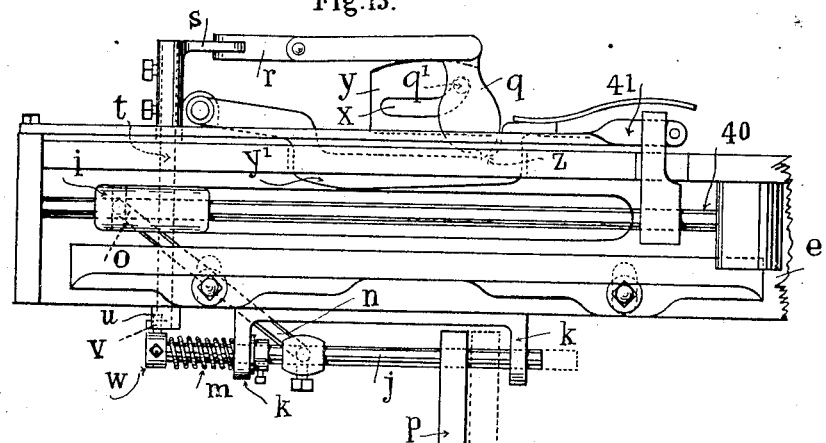
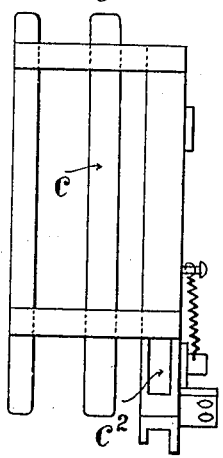
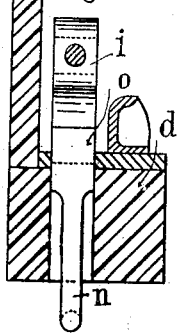
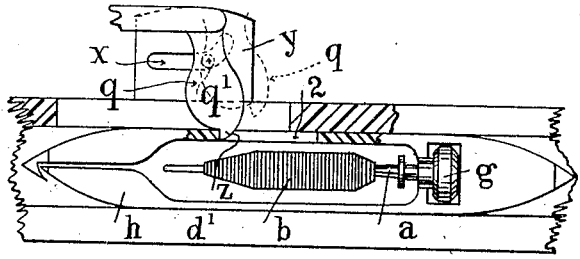
WITNESSES.
H. W. Sierichs
A. F. Heuman
INVENTOR.
Arthur James Jackson.
By his Attorneys Richardson
THE NORRIS PETERS CO., WASHINGTON, D.C.

UNITED STATES PATENT OFFICE.

ARTHUR JAMES JACKSON, OF ASHTON-ON-MERSEY, ENGLAND.

WEFT-REPLENISHING LOOM.

No. 878,531.   Specification of Letters Patent.   Patented Feb. 11, 1908.

Application filed July 30, 1906. Serial No. 328,333.

*To all whom it may concern:*

Be it known that I, ARTHUR JAMES JACKSON, a subject of Great Britain, residing at Surrey Lodge, Ashton-on-Mersey, in the county of Chester, England, manufacturer, have invented new and useful Improvements in Weft-Replenishing Looms, of which the following is a specification.

My invention refers to weaving looms and to means for automatically re-charging shuttles with weft cops or bobbins. For use with such automatic means I use a shuttle having a tongue or skewer which can be entirely ejected out of the shuttle when it is desired to renew the cop. For instance I may use a shuttle and shuttle tongue such as is described and illustrated in an application for United States Patent Serial No. 323594. The shuttle is also provided with any suitable device which will enable the shuttle to be self-threaded when a tongue bearing a new cop is automatically fed into the shuttle.

Figure 1:
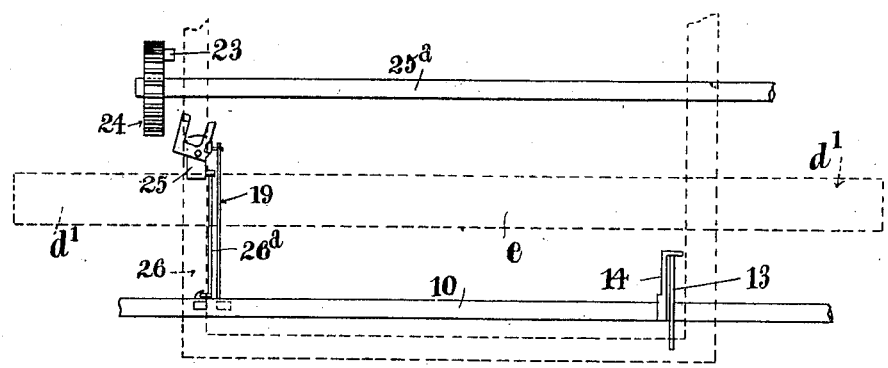
Figure 2:
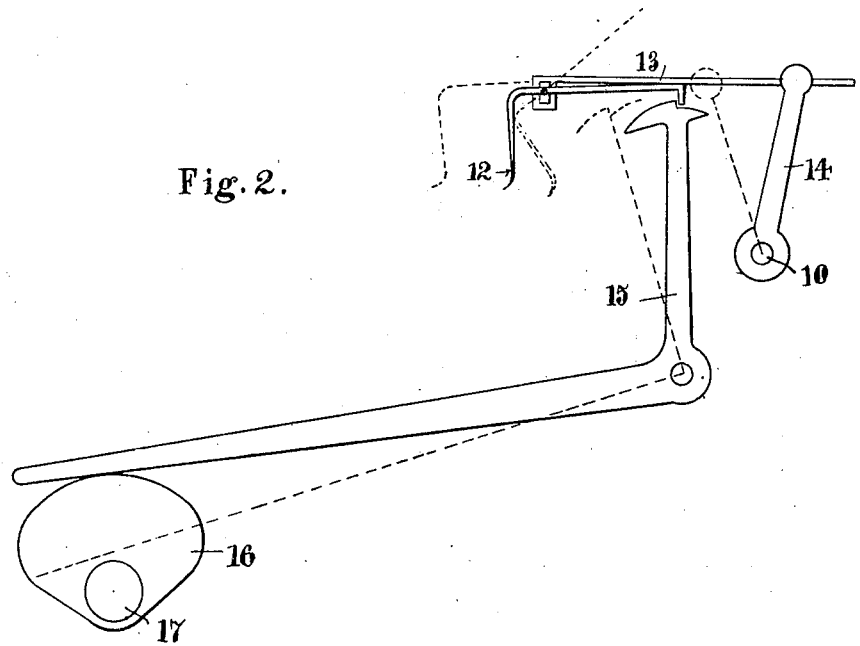
Figure 5:
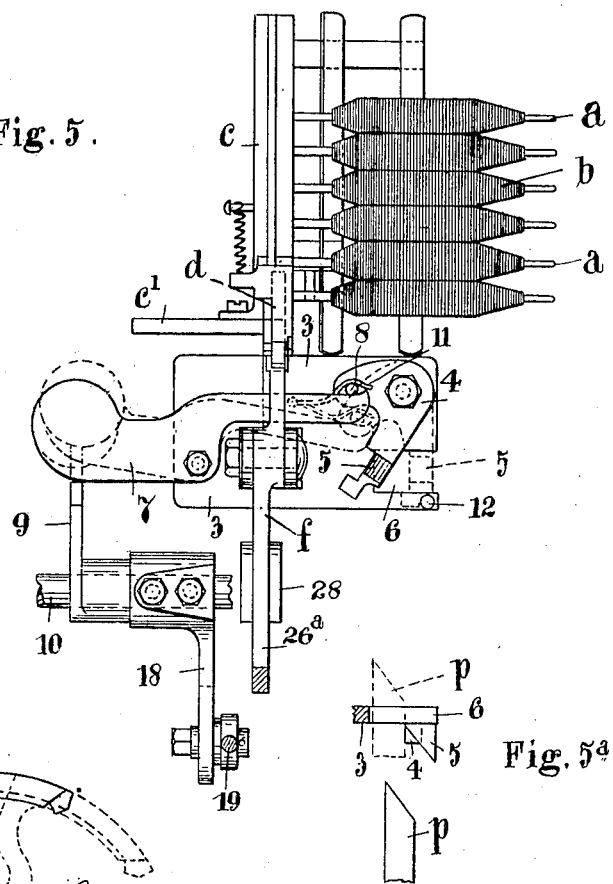
Figure 6:
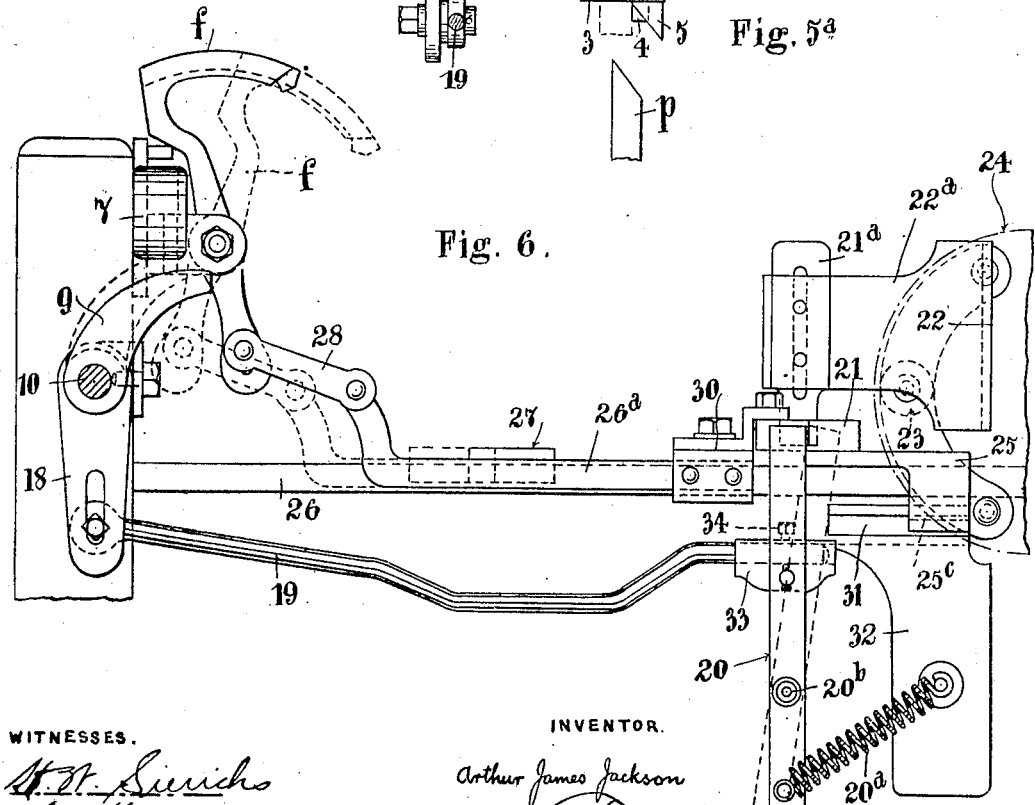
Figure 7:
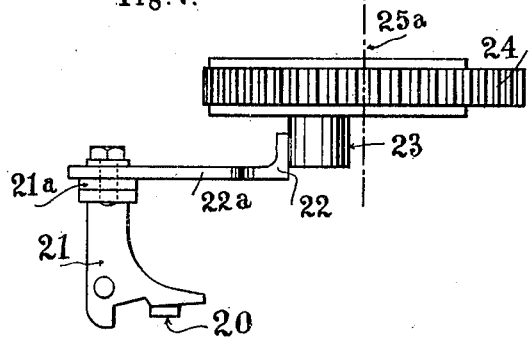
Figure 8:
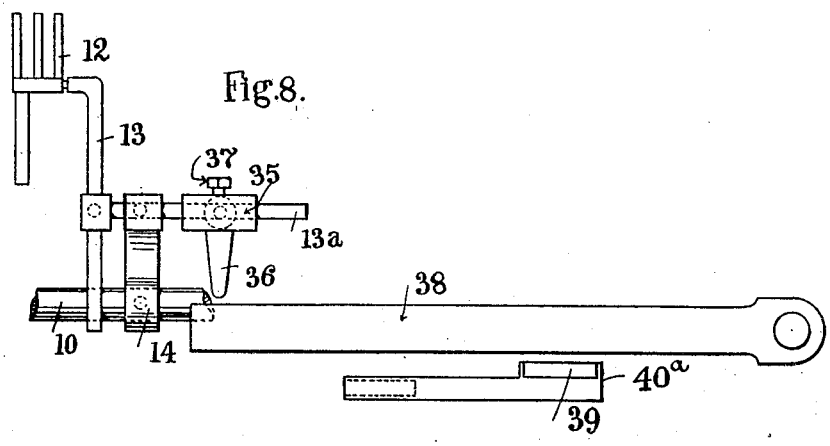
Figure 9:
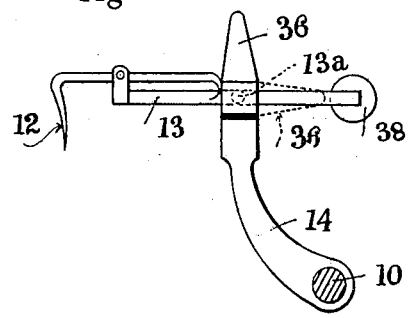
Figure 10:
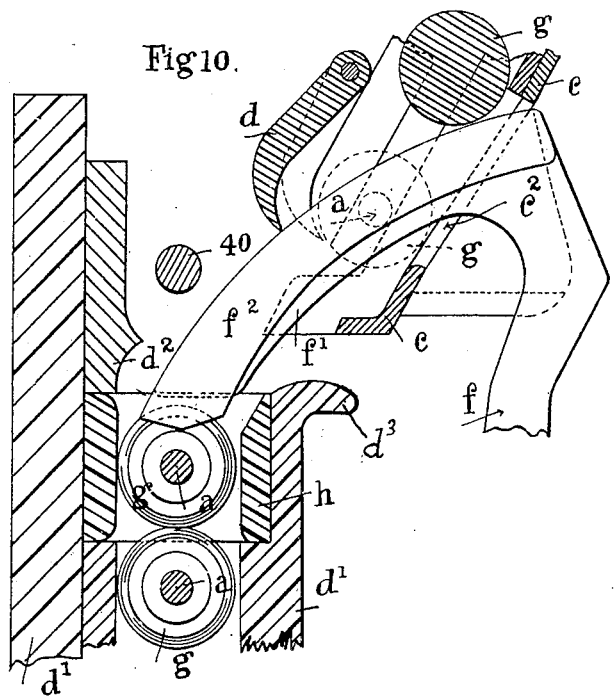
Figure 11:
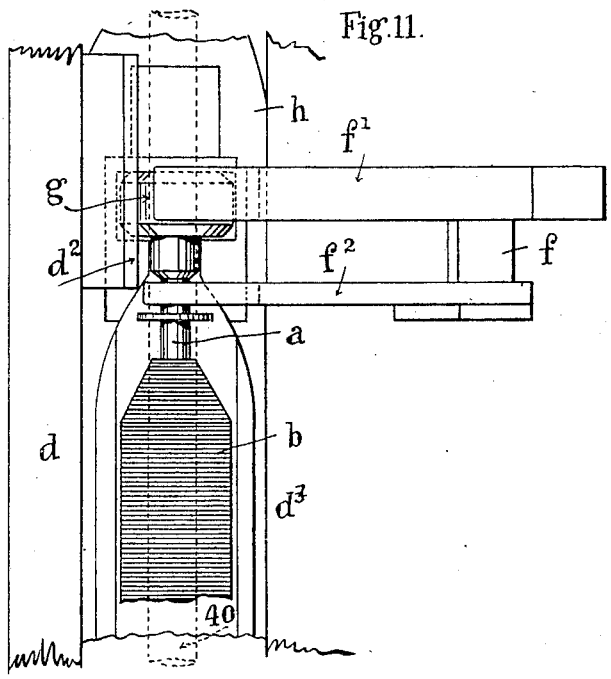

My invention is illustrated in the accompanying drawings in which,

Figure 1 shows a diagrammatic plan view of an ordinary loom showing how my invention is applied thereto. Fig. 2 shows the well known weft fork motion with slight modifications made therein. Fig. 3 is a side elevation of my novel mechanism looking from the outside of the loom frame. Fig. 4 is a plan thereof with the weft reservoir removed. Fig. 5 is an end elevation of part of the mechanism looking to the right of Fig. 3. Fig. 6 is a side elevation from the opposite side to Fig. 3. Fig. 7 is a plan of a part of Fig. 6. Fig. 8 shows in plan view how the loom can be converted into a non-automatic loom. Fig. 9 is an end view of these means. Fig. 10 shows in side sectional elevation, on an enlarged scale, the operation of changing of the weft carrier in the shuttle. Fig. 11 is a plan thereof. Fig. 12 is a front elevation of the shuttle box with mechanism, for insuring the correct positioning of the shuttle when a weft carrier is to be inserted therein. Fig. 13 is a plan thereof. Fig. 14 is a cross section. Fig. 15 a plan, partly in section, of part of the shuttle positioning device. Fig. 16 is a plan view of the reservoir for weft carriers. Fig. 17 is a front elevation thereof, and Fig. 18 a rear elevation.

In carrying my invention into effect I place the separate shuttle tongue $a$ bearing cops or bobbins $b$, in a hopper, or reservoir $c$ carried by a bracket $c'$ in which they will descend by gravity, the loose weft thread ends being secured to suitable retaining means on the loom in readiness to commence weaving and self threading of the shuttle. The reservoir $c$, is formed with a chamber adapted to contain the heads $g$ of the shuttle tongues (Fig. 16). The first of such tongues $a$ is retained within the reservoir $c$ by a spring latch $d$ and is disposed in close proximity to one of the shuttle boxes $d'$ when the lay $e$ is at the end of its forward stroke towards the breast beam as indicated in Fig. 10. In conjunction with such a reservoir $c$ I employ an ejector or pivoted hammer $f$, which on the failure of the weft is brought into action, when the lay is in its forward position towards the breast beam, to come into contact with the head $g$ of the first of the series of shuttle tongues $a$ in the reservoir $c$, forcing it out of the reservoir $c$ below the picker guide rod 40 and bringing its head $g$ into contact with the head of the shuttle tongue within the shuttle $h$. The shuttle tongue is guided into the shuttle by the curved plate $d^2$ carried by the shuttle box $d'$.

Suitable guides or means are employed to insure the correct position of the shuttle $h$ within the box $d'$ relatively to the shuttle tongues $a$ in the reservoir $c$. The tongue $a$ within the shuttle is thus ejected out of the bottom of the shuttle $h$ and through the shuttle box $d'$ which is provided with an aperture large enough for this purpose, as illustrated in Fig. 10, and the new shuttle tongue with cop or bobbin is forced in its place in the shuttle, and retained there. To retain the shuttle tongue in the shuttle the head $g$ fits into a chamber formed in the shuttle. The shuttle and tongue is more particularly described in my United States application for Patent Serial No. 323,594.

To fill the increased aperture in the bottom of the shuttle box the bottom of the picker $i$ is thickened accordingly. The means for guiding the shuttle always in correct position within the box are illustrated in Figs. 12 to 15. A spindle $j$ at the front side of the shuttle box $d'$, is slidable in bearings $k$ against a spring $m$. A connection $n$ carries a cranked arm $o$ passing up the shuttle box $d'$ and behind the picker $i$, and the spindle $j$ also carries a cam piece $p$. If the shuttle be shot too far within the box at the end of the forward stroke of the lay the cam piece $p$ comes into contact with a suitable cam on the frame of the loom which causes the rod to slide to some extent against the action of the spring $m$ as shown in dotted lines in Fig. 13, slightly actuating the picker $i$ by means of the arm $o$ to advance the shuttle to its proper position relative to the ejector $f$. Fig. 14 shows an end view of the cranked arm $o$ bearing against the picker $i$.

If the shuttle does not enter the box $d'$ quite far enough a pivoted finger $q$ is arranged to be vibrated by a link $r$, connected to a lever $s$ fixed to a spindle $t$ passing through the shuttle box, which spindle is oscillated through the medium of a crank $u$ thereon connected to a pin $v$ on a finger $w$ carried on the end of the spindle $j$. The finger $q$ has a pin $q'$ engaging with a curved slot $x$ formed in a bracket $y$ attached to the shuttle box $d'$, and when the spindle $t$ is oscillated by the spindle $j$ the finger $q$ is directed into the shuttle box passing below the swell $y'$, and a hook $z$ on the finger enters a slot 2 formed in the side of the shuttle $h$ and thrusts the shuttle further into the box as indicated in Fig. 15. The sliding movement of the spindle $j$ effects simultaneously the cranked arm $o$ and the finger $q$ to move towards each other to a defined position and thus insure the correct positioning of the shuttle.

The means for actuating the sliding spindle $j$ on the failure of the weft are particularly illustrated in Figs. 5 and 5$^a$. On the bracket 3 which supports the ejector $f$ is pivoted a bell crank lever 4 having an inclined or cam surface 5. The bracket 3 has an aperture 6 and while the lever 4 is held as shown in full lines in Fig. 5 the cam piece $p$ on the slidable spindle $j$ passes through the aperture 6 and is unaffected. The lever 4 is held as shown in full lines in Fig. 5 by a loaded lever 7 pivoted to the bracket 3 engaging with a pin 8 on the lever 4, the lever 7 being supported by a curved arm 9 on the shaft 10, which shaft is rocked on the failure of the weft as will be explained. When the shuttle has to be recharged with a weft cop the shaft 10 is rocked in its bearings raising the lever 7 into the position shown in dotted lines and, by means of a spring 11 engaging with the pin 8, forces the bell crank lever 4 into the position shown in dotted lines, against a stop pin 12 on the bracket 3. The cam piece $p$ on the spindle $j$ advancing with the shuttle box comes into contact with the cam piece 5 and as shown in dotted lines in Fig. 5$^a$, is directed through the slot 6 in a path which will insure the correct positioning of the shuttle. When the shaft 10 returns to its normal position the bell crank lever 4 is also returned by the loaded lever 7. The shuttle positioning device is only actuated by these means when required on the failure of the weft supply.

The cam piece 5 might be a fixture attached to the bracket 3 or other part of the loom, only in this case the shuttle positioning device would be actuated on every forward stroke of the lay towards the breast beam.

To bring the ejector $f$ into action at the required times I employ the weft fork 12 (see Fig. 2), which in non-automatic looms is used to stop the loom on failure of the weft. The weft fork 12 is pivoted to a carrier 13 attached to a lever 14 secured to the shaft 10, which is the shaft in non-automatic looms usually oscillated through the medium of the weft fork. The pivoted weft fork 12 is acted upon as usual by the oscillating hammer 15 which is actuated by a cam 16 on the cam shaft 17 as shown in the diagram Fig. 2. The cam 16 is shaped to give a sufficient dwell to the shaft 10 when the weft fork is actuated to provide time for the action of the weft changing apparatus.

Referring now to Figs. 3 to 9 I provide the shaft 10, with a lever 18 pivoted to a connecting rod 19 attached to a lever 20 fulcrumed at 20$^b$ on a suitable bracket of part of the loom frame. On the breakage of the weft the weft fork falls in the position shown in full lines in Fig. 2 and is actuated by the oscillating hammer 15 to vibrate the lever 14 and thus rock the shaft 10. Then the lever 18, and the connecting rod 19, actuate the pivoted lever 20 against a spring 20$^a$ as shown in dotted lines in Fig. 6. Normally the pivoted lever 20 rests in a gap formed in a pivoted elbow lever 21, as shown in Fig. 4, but the movement of the pivoted lever 20 into the position shown in dotted lines in Fig. 6 turns the elbow lever 21 in the position shown in Fig. 7 so as to thrust an angle face 22 formed on a bracket 22$^a$ secured to an upright extension 21$^a$ carried by the pivoted elbow lever 21, into the path of a bowl 23 carried by the usual spur wheel 24, on the main driving shaft 25$^a$ of the loom. The pivoted elbow lever is carried by a slide 25 mounted on a rail 26 at the side of the loom, which rail forms part of the usual frame of the loom or may be specially provided if necessary. To the slide 25 is secured a rod 26$^a$ further guided and supported by a clip bracket 27 embracing and sliding on the rail 26. The elbow lever thrusts forward the slide 25 and rod 26$^a$, which is connected by a link 28 to the pivoted ejector $f$ against the action of a spring 29 or load. The ejector or pivoted hammer is thus turned on its pivot as shown in dotted lines in Fig. 6, and, as indicated in Fig. 10, thrusts the lowest of the series of weft holders $a$ out of the reservoir $c$ into the shuttle at the same time ejecting the tongue within the shuttle.

The elbow lever 21 is secured to the slide 25 by means of a bracket 30 attached to the slide, a pivot pin (see Fig. 4) passing through the brackets 30 and lever 21 into the slide 25. The slide 25 is guided and maintained on the rail 26 by means of an angle foot 25$^c$ forming part of the slide 25 which foot 25ᶜ is disposed within a slot or recess 31 formed in a bracket 32 attached to the loom. The bracket 22ᵃ is attached by screws to the extension 21ᵃ of the elbow lever 21. It will be seen from Fig. 3 that the extension 21ᵃ is formed with a vertical slot and the bracket 22ᵃ with horizontal slots so that vertical and horizontal adjustment of the bracket 22ᵃ can be obtained. When the bowl 23 leaves the face 22 of the bracket the whole of the parts are returned to their normal position by the springs 20ᵃ and 29. The limb $f'$ of the pivoted hammer $f$ passes through a slot $c^2$ formed in the back of the reservoir $c$ and bears against the head $g$ of the shuttle tongue, while the limb $f^2$ by coming into contact with the shuttle tongue $a$ will prevent the tendency of the shuttle tongue to tilt up when being forced into the shuttle.

The weft fork, is timed to actuate the ejector only when the shuttle is in the proper box for changing the weft supply. The replenishing of the weft is effected when the lay rests upon its extreme forward point of its beat. The weft fork is arranged at the opposite side of the loom to the pivoted hammer or ejector as will be seen from the diagram Fig. 1, although the ejector mechanism and the weft fork may be arranged at the same side of the loom.

It will be evident that the oscillating shaft 10, the motion of which is utilized to bring the automatic weft feeding means into action may be actuated by other means than a weft fork, such as any suitable feeler mechanism which is now used for oscillating or rocking such a shaft on failure of the weft supply.

I further provide means, where by a simple movement the automatic weft feeding means may be put out of action and the loom made non-automatic. To effect this the connecting rod 19 attached to the lever 18 is secured to the pivoted lever 20 which operates the automatic means, by passing loosely through a sleeve 33 secured to the pivoted lever 20, and when the automatic weft changing means are in operation is rigidly connected to the sleeve 33 by a set screw 34. When it is desired to disconnect the automatic weft feeding means it suffices to loosen the set screw 34 and the connecting rod 19 will slide in the sleeve 33 without affecting the pivoted lever 20. In this case to stop the loom in the ordinary way on breakage or failure of the weft, and as shown in Figs. 8 and 9, I provide the weft fork carrier 13 with a rod 13ᵃ by means of which it is connected to the lever 14 secured to the oscillating shaft 10 and this rod passes loosely through a sleeve 35 carried on a lever or part 36 which when vibrated is adapted to put into action the usual or any convenient stop motion. A set screw 37 or the like is also provided to secure the rod 13ᵃ rigidly to the sleeve 35. When the automatic means are at work the sleeve is turned and secured with the lever or part 36 in the position shown in full lines in Fig. 9 on the rod 13ᵃ so that the usual stop motion is unaffected when the weft fork is actuated on the failure of the weft. When the automatic means are disconnected the set screw 37 is employed to lock the lever or part 36 on the rod 13ᵃ in the horizontal position shown in full lines in the plan view Fig. 8 and in dotted lines in Fig. 9, so that on the breakage or failure of the weft the part 36 acts against the usual pivoted lever 38 to remove the lever 39 out of the retaining notch 40ᵃ whereby the ordinary stop motion comes into action to stop the loom.

No alteration of any moment is required to the shuttle boxes of existing non-automatic looms when applying my invention to such looms.

In overpick looms, to which I have shown my invention applied in the drawings, the weft carriers $a$ are fed to the shuttle between the guide rod 40 for the picker and the usual metallic shuttle guard $d^3$ (see Fig. 10), the buffer strap 41 being removed from the front to the back of the shuttle box as shown in Fig. 13.

The invention can be applied equally well to underpick looms, with slight regulation or adjustment of the positioning device, which would call for no invention and could be readily effected by the skilled machinist.

I declare that what I claim is.

1. In combination in apparatus for automatically supplying weft carriers to loom shuttles on the failure of the weft, a self-threading loom shuttle, separate weft tongues for such shuttles and means for securing such weft tongues in the shuttle, a reservoir for such weft tongues, a pivoted ejector, a rod connected to the pivoted ejector, a slide connected to the rod, an elbow lever pivoted to the slide having an angle plate, a bowl on the spur wheel of the driving shaft of the loom, a pivoted lever arranged in conjunction with the elbow lever and means for oscillating the pivoted lever on failure of the weft supply to bring the angle plate into the path of the bowl to actuate the slide and means for insuring the correct positioning of the shuttle when automatically renewing the supply of weft therein substantially as described.

2. In apparatus for automatically supplying weft carriers to loom shuttles on the failure of weft a reservoir for the weft carriers, a pivoted ejector, a rod connected to the pivoted ejector, a slide connected to the rod, an elbow lever pivoted to the slide and carrying an angle plate, a bowl on the spur wheel of the driving shaft of the loom, a pivoted lever arranged in conjunction with the elbow lever and means for oscillating the pivoted lever on failure of the weft supply to partially rotate the elbow lever and thus bring the angle plate carried thereby into the path of the bowl on the spur wheel to actuate the slide and operate the pivoted ejector substantially as described.

3. In apparatus of the indicated nature the means for actuating the pivoted ejector consisting of a slide, a rod connected to the ejector and to the slide, an elbow lever pivoted to the slide and carrying an adjustable angle plate, a rock shaft operated through the medium of the weft fork or feeler mechanism on the failure of the weft, a lever on such rock shaft, a rod connected to such lever and to a pivoted lever engaging with the elbow lever, a bowl on the spur wheel of the driving shaft arranged in the manner and substantially as described.

4. In combination in automatic weft supplying apparatus, shuttle tongues, bearing cops and means for inserting such shuttle tongues and cops into the shuttles between the picker guide rod and the shuttle box guard, said means consisting of a pivoted ejector, a slide adapted to operate the ejector and means for actuating the slide through the medium of a bowl carried by the spur wheel of the driving shaft of the loom, substantially as described.

5. The arrangement of parts for insuring the correct positioning of the shuttle when automatically renewing the supply of weft therein, consisting of a spindle, a spring against which the spindle is slidable, a cam piece on the spindle, a cranked arm on the spindle disposed behind the picker, a rotatable spindle connected to the slidable spindle, a crank on the rotatable spindle, a hooked finger actuated by the crank, a pin on such finger, a bracket formed with a curved slot in which slot the pin is slidable, a slot formed in the shuttle with which the hooked finger is adapted to engage, a cam on the loom frame to engage with the cam on the slidable spindle substantially as described.

6. The arrangement of parts for insuring the correct positioning of the shuttle when automatically renewing the supply of weft therein, consisting of a spindle slidable in bearings against the action of a spring, a cam piece, on the spindle, and a cranked arm adapted to enter the shuttle box behind the picker, a spindle partly rotated by the sliding spindle, a crank on the rotatable spindle, a hooked finger actuated by the crank mounted in a curved slot and engaging with a slot formed in the shuttle, a bell crank lever, a cam on such bell crank lever, means for normally holding the bell-crank lever out of the path of the cam on the slidable spindle, and means for actuating the bell-crank lever on failure of the weft to bring the cam on the slidable spindle in contact with the cam on the bell-crank lever substantially as described.

7. The means for putting out of action the automatic weft feeding means and reverting to a non-automatic loom consisting of the set screw 34 to disconnect the rod 19 from the lever 20, a carrier 13, a lever 14 on the oscillating shaft 10, a weft fork on the carrier 13, a pivot on the carrier a sleeve mounted on such pivot, a projection on the sleeve, a pivoted lever adapted to be operated by the projection, to actuate the stop rod of the loom substantially as described.

8. In combination in automatic weft supplying apparatus, shuttle tongues, bearing cops and means for inserting such shuttle tongues and cops into the shuttles between the picker guide rod and the shuttle box guard, said means comprising a curved guide plate $d^2$ carried by the shuttle box, a pivoted ejector and means for actuating the ejector substantially as described.

In testimony whereof I have signed my name to this specification in the presence of two subscribing witnesses.

ARTHUR JAMES JACKSON.

Witnesses:
RICHARD IBBERSON,
ALFRED YATES.